July 5, 1938.   R. B. SMITH   2,122,762
ART OF DISTILLATION
Filed March 11, 1933
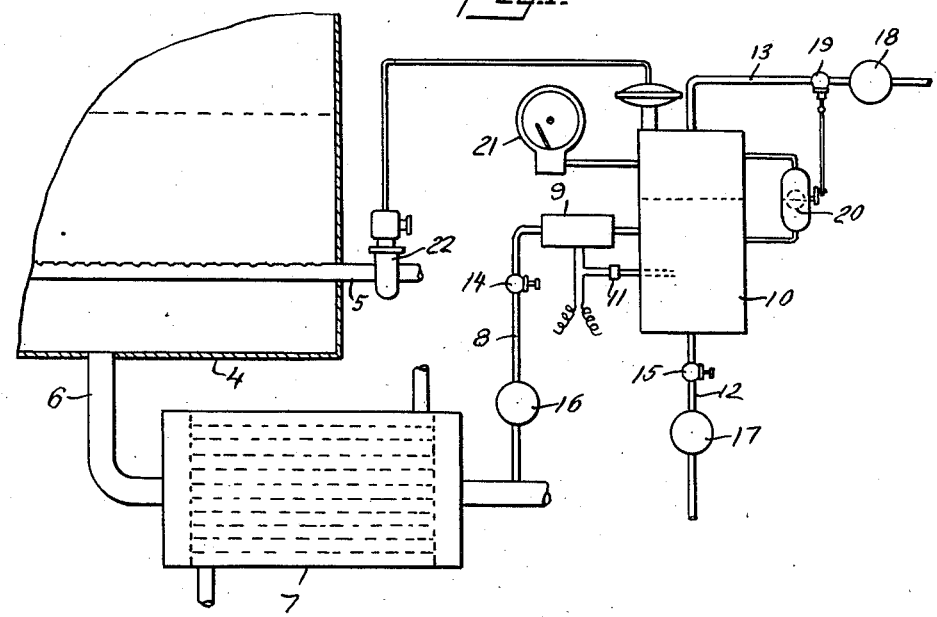
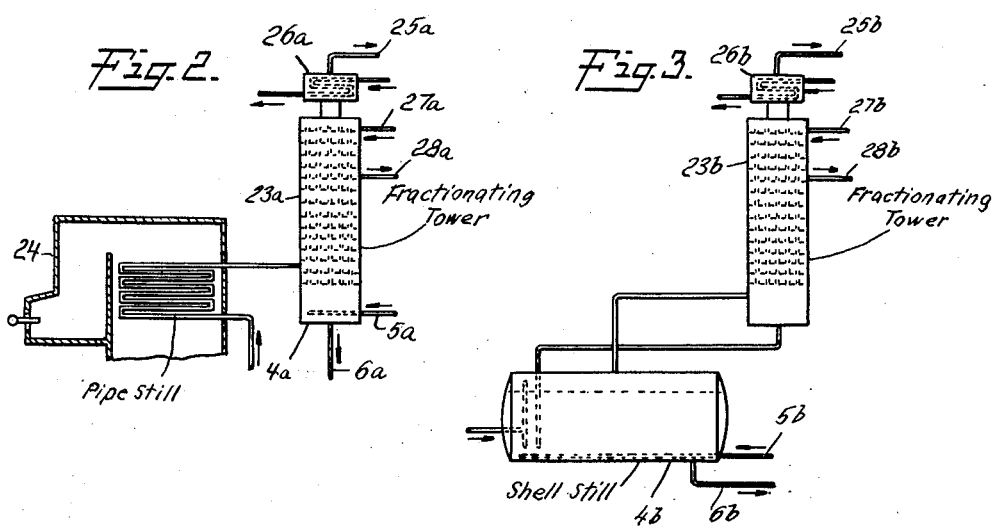
INVENTOR
Reading B. Smith
BY
ATTORNEYS Patented July 5, 1938

2,122,762

UNITED STATES PATENT OFFICE 2,122,762

ART OF DISTILLATION

Reading B. Smith, Attleboro, Mass., assignor to Sinclair Refining Company, New York, N. Y., a corporation of Maine Application March 11, 1933, Serial No. 660,336

2 Claims. (Cl. 196—132)

This invention relates to improvements in the fractional separation, by distillation, of constituents of mixtures of at least two constituents. The invention is of special value and application, for example, in the fractional distillation of petroleum oils.

More particularly, this invention provides apparatus for controlling, automatically, the rate of introduction of a stripping medium to maintain the residual product of such fractional distillation of uniform vapor pressure. The advantages of the invention appear particularly as heat economies although they also appear in other aspects such as simplified control.

It is common practice, in fractional distillation of petroleum oils for example, to vaporize lower boiling constituents from an initial mixture by heating the mixture and by directly introducing a stripping medium, such as steam, into the mixture, or into a residual mixture remaining after an initial separation of lower boiling constituents, to effect a separation of one or more lower boiling products and a higher boiling residual product. In such practice the vaporized constituents are usually subjected to fractionation by countercurrent direct contact with reflux condensate, in a so-called "bubble tower" for example. This reflux condensate is formed either by cooling, by indirect heat exchange, the vapor mixture or by the direct introduction of a refluxing medium, such as a part of the lowest boiling product. Regulation of the rate of introduction of the stripping medium is usually accomplished as a matter of trial and error and, as a consequence, the rate of refluxing, which for maximum economy should be regulated solely with respect to the fractionation required, becomes involved in a secondary regulation of the effect of stripping medium introduced in excess of that minimum required to produce a residual product of the intended characteristics. That is, when the rate of introduction of the stripping medium is so regulated, a supplementary regulation of the effect of the introduced stripping medium is added to the normal function of the reflux control so that the rate of refluxing then must be regulated not only to maintain the required fractionation but also to correct for the effect of excess stripping medium. An important economy is to be had by limiting the amount of stripping medium used to the minimum required, and a further and usually even more important economy is to be had by maintaining the minimum refluxing rate necessary to secure the required fractionation.

This invention, by providing apparatus for continuously regulating the rate of introduction of the stripping medium to maintain this rate continuously at the required minimum, leaving the rate of refluxing to be controlled solely with respect to the required fractionation, enjoys both of these economies.

The apparatus of this invention consists essentially of a closed chamber, connections for supplying a liquid thereto and for discharging liquid therefrom, means for maintaining a constant ratio between rate of liquid supply and rate of liquid discharge, means for maintaining a constant temperature in the chamber, a connection for discharging vapors from the chamber, means responsive to changes in liquid level in the chamber for increasing the rate of vapor discharge as that level rises and vice versa, and means connected to the chamber responsive to changes in pressure therein.

As embodied in apparatus for fractional distillation, connections are provided for supplying a part of the residual product of the fractional distillation to the closed chamber previously mentioned and means responsive to changes in pressure in this closed chamber are provided for decreasing the rate of introduction of stripping medium, in the fractional distillation, as that pressure decreases and vice versa. The vapor pressure of the residual product is a direct measure of the extent to which constituents suitable as components of the lower boiling fraction or fractions separated in the fractional distillation have been stripped from this residual product. The pressure in the closed chamber in the apparatus of this invention, while not a direct measure of the vapor pressure of the liquid supplied thereto, varies proportionately with variations of this vapor pressure and, thus, increases and decreases as the vapor pressure of that part of the residual product of the fractional distillation supplied thereto increases and decreases respectively. With increase of the pressure in this closed chamber, the rate of introduction of the stripping medium is increased tending to reduce the vapor pressure of the residual product, and with decrease of the pressure in this closed chamber the rate of introduction of the stripping medium is decreased tending to increase the vapor pressure of the residual product of this particular fractionation.

The invention will be further described in connection with the accompanying drawing which illustrates, diagrammatically and conventionally, in Fig. 1, in elevation and partly in section and with parts broken away, one form of apparatus embodying the invention, and, in Figs. 2 and 3, two forms of fractional distillation apparatus with which the apparatus of the invention may be combined.

Referring to Fig. 1, the reference character 4 designates a lower part of a vaporizing chamber forming part of a fractional distillation apparatus, connection 5 being provided for the introduction of a stripping medium, such as steam, and connection 6 being provided for the discharge of the residual product of the fractional distillation. The connections corresponding to connections 5 and 6 are designated 5a and 5b and 6a and 6b, respectively, in Figs. 2 and 3.

Again referring to Fig. 1, after passing through the cooler 7, a small part of the residual product discharged from the vaporizing chamber 4 is supplied, through connection 8 and heater 9, to the closed chamber 10. The heater 9 is arranged to maintain a constant temperature within the chamber 10. This heater, for example, may take the form of an electric heater controlled by a thermostat 11, as in the apparatus illustrated, or it may take the form of a steam or hot oil heater controlled by equivalent thermostatic means similarly arranged. Unvaporized liquid is discharged from the chamber 10 through connection 12 and vapors are discharged therefrom through connection 13. Valves 14 and 15 are provided in the connections 8 and 12, respectively, for maintaining a constant ratio between the rate of liquid supply and the rate of liquid discharge to and from this chamber. Appropriate fixed orifices may be substituted for these valves where the apparatus is to be used for a single purpose under uniform conditions for prolonged periods. Where necessary to maintain flow through the chamber 10, a pump may be provided at 16 or a pair of pumps may be provided at 17 and 18. The provision of a pump having a constant delivery rate at 16 is sometimes useful, particularly where fixed orifices are substituted for the valves 14 and 15, for maintaining a uniform rate of supply of liquid to the chamber 10. A valve 19, actuated by a float 20 positioned by the liquid level in the chamber 10, is provided in connection 13, the linkage being such that this valve is opened as the level rises and closed as the level falls. In the apparatus illustrated, a recording pressure gauge 21 and the control element of valve 22, in connection 5, are connected to the chamber 10. The control element of valve 22 is arranged to open this valve as the pressure in chamber 10 increases and to close it as this pressure decreases.

In the apparatus illustrated in Fig. 2, the vaporizing chamber 4a takes the form of the lower part of a fractionating tower 23a into which a pipe still 24 discharges. In the apparatus illustrated in Fig. 3, the vaporizing chamber 4b takes the form of a shell still connected to a fractionating tower 23b. The fractionating towers 23a and 23b, respectively, are illustrated as provided with vapor lines 25a and 25b connected to appropriate condensers (not shown), reflux condensers 26a and 26b and connections 27a and 27b for the direct introduction of a refluxing medium for controlling fractionation within the towers, and connections 28a and 28b for taking off an intermediate fraction.

Assuming the apparatus of the invention, as illustrated in Fig. 1, to be used in connection with the fractional distillation of a petroleum oil, for example, its operation is as follows: A uniform temperature high enough to vaporize some of the liquid supplied to the chamber 10 through connection 8 is maintained in the chamber 10 by means of the thermostatically controlled heater 9. The material vaporized in the chamber 10 is more or less continuously discharged through connection 13 to avoid any accumulation of particular vapor constituents within the vapor space in this chamber which might, cumulatively, interfere with the proper functioning of the control. Vapor and liquid phases being in equilibrium within the chamber 10, the pressure within that chamber is proportional to the vapor pressure of the liquid supplied thereto at the particular temperature maintained therein. The ratio between the rate of liquid supplied through connection 8 and the rate of liquid discharged through connection 12 being maintained substantially constant by means of the valves 14 and 15, or equivalent fixed orifices, the pressure within the chamber 10 remains constant so long as the vapor pressure of the liquid supplied through connection 8 remains constant. The rate of liquid efflux through line 12 normally approximates the rate of influx through line 8. In constant operation the efflux liquid is less than the influx material only by an amount corresponding to that portion of the influx material which vaporizes under the conditions prevailing in chamber 10. With any increase in the vapor pressure of that liquid, however, the liquid level in the chamber 10 tends to fall because of increased vaporization therein, the valve 19 actuated by float 20 tends to close and the pressure within the chamber 10 tends to increase. This amplified increase in pressure in the chamber 10 operates, through the pressure controlled valve 22 to increase the rate of introduction of stripping medium through connection 5 into the vaporizing chamber 4 from which the residual product, part of which is supplied to the chamber 10 through connection 8, is discharged. Increase in the rate of introduction of the stripping medium immediately tends to reduce the vapor pressure of the residual product discharged from the vaporizing chamber 4 and thus to restore the equilibrium for which the apparatus is adjusted. With any decrease in the vapor pressure of the liquid supplied to the chamber 10, the level therein tends to rise because of reduced vaporization, causing the valve 19 to open, the pressure within the chamber 10 to decrease and the rate of introduction of stripping medium through connection 5 to decrease, and thus to restore this equilibrium. Once adjusted for the particular operation, that is to produce a residual product of the intended characteristics, control of the rate of introduction of the stripping medium thus becomes completely automatic. The apparatus of the invention is of general application in connection with the fractional distillation of petroleum oils; it is applicable for example to the re-running of gasolines and to the fractional distillation of lubricating stocks, both distillates and residuums.

In one aspect the invention does more than make possible the heat economies to which reference has been made; it virtually compels them to be made. With the rate of introduction of the stripping medium controlled by the apparatus of this invention, the rate of refluxing is controlled solely with respect to the required fractionation. If the rate of refluxing is permitted to become excessive, the rate of introduction of the stripping medium tends to increase but, assuming the stripping medium to be appropriately metered, any relaxation of careful control of the rate of refluxing for maximum economy is immediately apparent in increased consumption of the stripping medium above the maximum experience will have demonstrated to be sufficient.

Broadly, the invention comprises, in conjunction with apparatus for fractional distillation involving the introduction of a stripping medium, means responsive to increase and decrease in the vapor pressure of the residual product of the operation for continuously increasing and decreasing, respectively, the rate of introduction of the stripping medium.

While the apparatus of the invention is of special value and application in the connection in which it has been more particularly described and illustrated herein, it is also useful in conjunction with fractional distillation operations in other connections, as an instrument for continuously recording a measure of the vapor pressure of any product of the operation, either a distillate product or a residual product, independently of the feature of control, for example, and similarly as an instrument for continuously recording a measure of the vapor pressure of liquids independently of any distillation operation, for continuously testing blended motor fuel gasolines with respect to vapor pressure, for example. The invention thus includes the apparatus of the invention as a means for continuously measuring or recording a measure of the vapor pressure of liquids as well as this apparatus in combination with apparatus for fractional distillation embodying, in this combination, the feature of automatic control.

I claim:

1. In combination, a closed chamber, connections for supplying a liquid thereto and for discharging liquid therefrom, means for maintaining a substantially constant ratio between rate of liquid supply and rate of liquid discharge, means for maintaining a constant temperature therein, a connection for discharging vapors therefrom, means responsive to changes in liquid level therein for increasing the rate of vapor discharge as that level rises and vice versa, and means responsive to changes in pressure connected to said chamber.

2. In combination with a vaporizing chamber including means for direct introduction of a stripping medium, a closed chamber, connections for supplying unvaporized liquid from the vaporizing chamber thereto and for discharging liquid therefrom, means for maintaining a substantially constant ratio between rate of liquid supply and rate of liquid discharge, means for maintaining a constant temperature therein, a connection for discharging vapors therefrom, means responsive to changes in liquid level therein for increasing the rate of vapor discharge as that level rises and vice versa, and means responsive to changes in pressure therein for decreasing the rate of introduction of stripping medium through the first-mentioned means as that pressure decreases and vice versa.

READING B. SMITH.